United States Patent [19]

Mizuno

[11] Patent Number: 5,508,775
[45] Date of Patent: Apr. 16, 1996

[54] METHOD AND APPARATUS FOR FINISHING PILE FABRIC

[75] Inventor: Kazunori Mizuno, Kanagawa, Japan

[73] Assignee: Fuji Photo Film Co., Ltd., Kanagawa, Japan

[21] Appl. No.: 302,259

[22] Filed: Sep. 8, 1994

[30]     Foreign Application Priority Data

Sep. 8, 1993 [JP] Japan .................................. 5-223702

[51] Int. Cl.⁶ .......................... B29C 53/14; D04H 11/00;
                                   D06C 13/00; G03B 17/26
[52] U.S. Cl. .............................. 354/277; 26/106; 28/159;
                                   264/103; 425/322; 428/92
[58] Field of Search ..................................... 354/275, 277;
                242/348.4; 26/106; 28/159, 162; 264/103,
                                   280; 425/319, 322; 428/92

[56]            References Cited

U.S. PATENT DOCUMENTS 5,341,188  8/1994  Kawasaki et al. ..................... 354/277

FOREIGN PATENT DOCUMENTS 46-28218    9/1971  Japan .
55-12917    1/1980  Japan .
62-286042  12/1987  Japan .
62-286041  12/1987  Japan .

Primary Examiner—Michael L. Gellner
Assistant Examiner—J. K. Han
Attorney, Agent, or Firm—Sughrue, Mion, Zinn, Macpeak & Seas

[57]            ABSTRACT

To incline piles of plush ribbons in a diagonal direction, the plush ribbons moistened at a predetermined rate are brought into contact with a heating drum in a longitudinal direction of the plush ribbon while twisting the plush ribbon about a longitudinal axis thereof. Thereafter, the plush ribbons are helically wound around the heating drum while rotating the heating drum at a peripheral speed different from a feeding speed of the plush ribbon.

19 Claims, 7 Drawing Sheets

METHOD AND APPARATUS FOR FINISHING PILE FABRIC

BACKGROUND OF THE INVENTION

1. Field of the Invention

The present invention relates to a method of finishing pile fabrics and an apparatus therefor. The present invention relates more particularly to a method of inclining piles of plush ribbon used as light-trapping members to be attached to a film passage mouth of a photographic film cassette, especially for those where a film leader is advanced out of the photographic film cassette through the film passage mouth.

2. Related Art

It is well known in the art of photographic film cassette to attach light-trapping members made of plush ribbon to the upper and lower inside surface of the film passage mouth, in order to shield ambient light from interior of the cassette.

Recently, photographic film cassettes, in which an entire photographic film is wound on a spool and contained in a cassette shell in order to facilitate the loading of the photographic film cassette into a camera, have been suggested. In such a photographic film cassette, the leading end of the photographic film is advanced out of the cassette shell, through a film passage mouth, by rotating the spool in a film advancing direction or film unwinding direction.

For these leader-advancing type photographic film cassettes, it is necessary to incline piles of the plush ribbon in the width direction of the light-trapping members toward the film advancing direction, in order to reduce advancing torque of the spool or resistance against the film advance through the light-trapping members.

A method of making such a light-trapping member that has inclined piles is disclosed in U.S. application Ser. No. 08/050,567 (filed on Apr. 21, 1993, corresponding to Japanese Patent Application No. 4-101152), wherein the piles of the plush ribbon are pressed against the peripheral surface of a heating drum, while the ribbon being fed in the longitudinal direction and twisted relative to the ribbon feeding direction.

It is also disclosed in the prior art to impart inclination to the piles of the plush ribbon in the longitudinal direction by rotating the heating drum at a different peripheral speed from the feeding speed of the plush ribbon. The inclination of the piles in both width and longitudinal directions, that is, in a diagonal direction, contributes to smooth and unfailing film advance. This is because the piles of the one light-trapping member can be oriented in a diagonal direction crossing the piles of the other light-trapping member, so that the piles are prevented from getting tangled.

However, in the above-mentioned pile inclining method, the force that makes the piles incline in the width direction is applied to the piles merely in a moment when the plush ribbon contacts the heating drum. Therefore, the force is insufficient for the inclination in the width direction, so that it is difficult to permanently incline the piles of the plush ribbon in a diagonal direction by the above-described method.

SUMMARY OF THE INVENTION

In view of the foregoing, a primary object of the present invention is to provide a pile inclining method which uniformly and securely impart inclination to the piles of the plush ribbon in an oblique direction.

This and other objects of the present invention are achieved by bringing the piles of the plush ribbon having a predetermined moisture content, into contact with a heating drum in a longitudinal direction of the plush ribbon while twisting the plush ribbon about a longitudinal axis thereof and, thereafter, helically winding the plush ribbon around the heating drum while rotating the heating drum at a peripheral speed different from a feeding speed of the plush ribbon.

According to the present invention, after the piles are inclined in the width direction at the contact on the heating drum due to the twist of the plush ribbon, and are inclined in the longitudinal direction due the difference between the peripheral speed of the heating drum and the ribbon feeding speed, and thereafter the diagonal inclination of the piles is secured by helically sliding the plush ribbon on the heating drum while drying the plush ribbon.

According to a preferred embodiment, the plush ribbon, after being helically wound around the first heating drum, is pressed against a second heating drum having a higher surface temperature than the first heating drum, thereby to heat set the diagonal inclination of the piles.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENT

Figure 1:
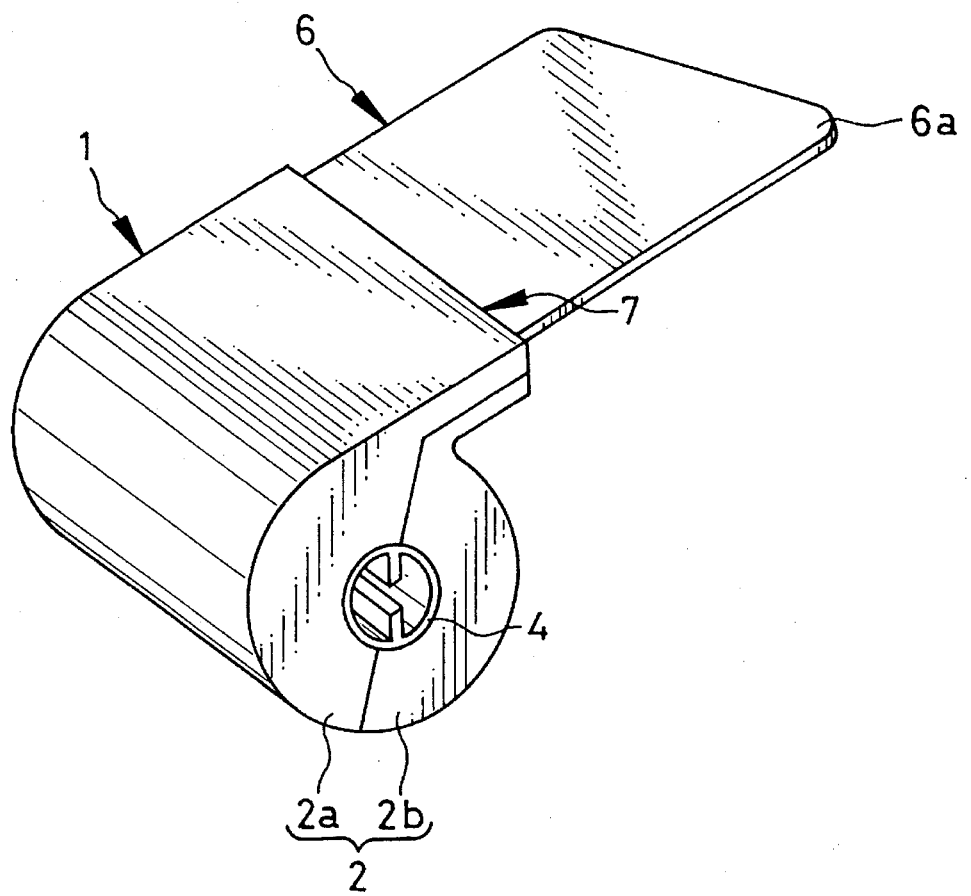
FIG. 1 is a perspective view of a photographic film cassette in which the leading end of a photographic film is contained within a cassette shell and advanced to the outside.
Figure 2:
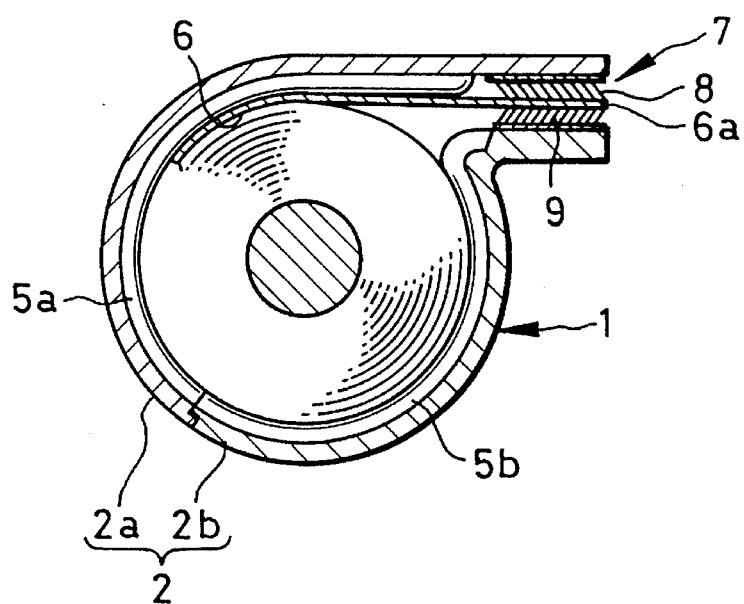
FIG. 2 is a cross section of the photographic film cassette of FIG. 1.

Referring to FIGS. 1 and 2, a photographic film cassette 1 has a cassette shell 2 which rotatably supports a spool 4, having a roll of photographic film 6 thereon. The entire photographic film 6 is initially contained in the cassette shell 2. The cassette shell 2 consists of two shell halves 2a and 2b and is provided on an inside surface with ridges 5a and 5b, to prevent the roll of photographic film 6 from loosening. In the alternative, the roll of photographic film 6 may be clamped by a pair of flanges of the spool 4 instead of the ridges 5a and 5b. A leading end 6a of the photographic film 6 is advanced through a film passage mouth 7, by rotation of the spool 4 in the unwinding direction. Light-trapping members 8 and 9 are attached to the upper and lower inside surfaces of the film passage mouth 7.

Figure 3:
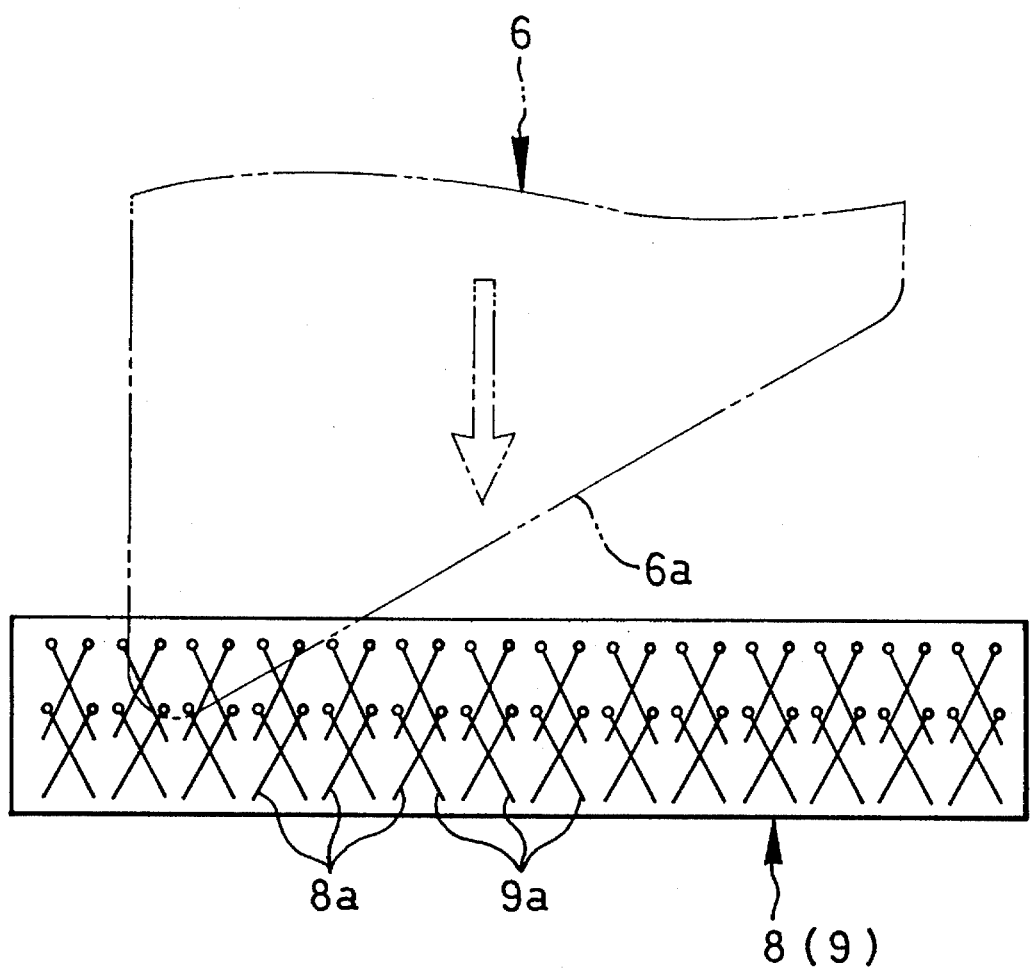
FIG. 3 is an explanatory diagram illustrating a relationship between the leading end of the photographic film, piles of an upper light-trapping member, and piles of a lower light-trapping member of the photographic film cassette.

As shown in FIG. 3, piles 8a and 9a of the light-trapping members 8 and 9 are inclined in the film advancing direction aslant toward the opposite sides such that the piles 8a of the upper light-trapping member 8 intersect the piles 9a of the lower light-trapping member 9. Thereby, the piles 8a are prevented from getting tangled with the piles 9a, permitting the leading end 6a of the photographic film 6 to smoothly thrust through the light-trapping members 8 and 9. To ensure the smooth advancing, the leading end 6a is diagonally cut at an inclination angle of 60° relative to a longitudinal direction, that is, the advancing direction, of the photographic film 6.

Figure 4:
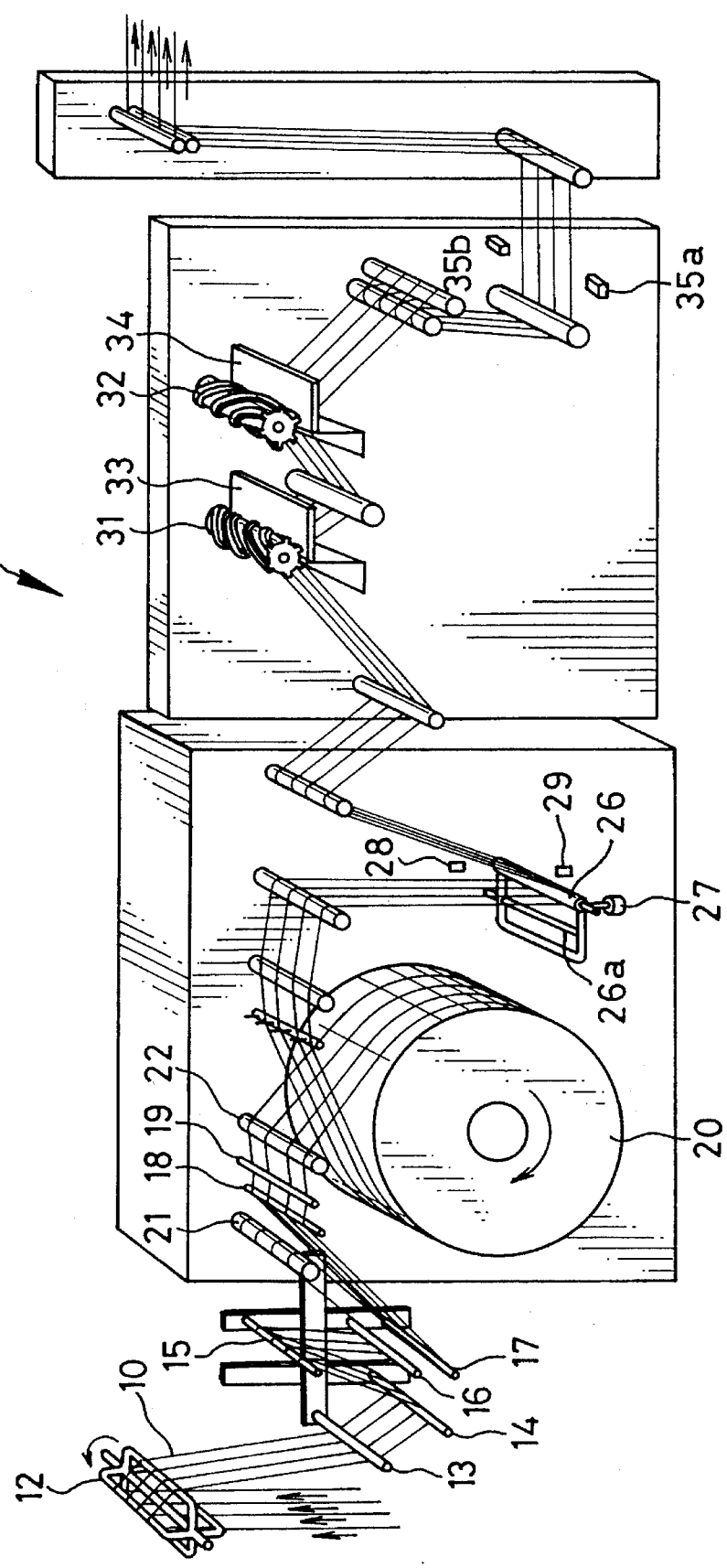
FIG. 4 is a schematic diagram illustrating a shearing apparatus for shearing the piles prior to a pile inclining process.

The light-trapping members 8 and 9 are made of a plush ribbon 10 woven to have a width of 1 mm to 10 mm, preferably 2 mm to 6 mm. A plurality of, e.g., four plush ribbons 10 are fed to a shearing apparatus 11 in parallel with one another, as is shown in FIG. 4. The plush ribbons 10 are first subjected to an untwisting process in an untwisting device 12 for straighten the respective plush ribbons 10, while the plush ribbons 10 are transported with their piles on the upside thereof. The untwisting device 12 rotates in a direction reverse to the ribbon feeding direction. It is possible to adopt a stationary untwisting device that makes use of self-untwisting motion of the plush ribbons 10.

Thereafter, the plush ribbons 10 are wound around a rotary heating drum 20 which heats the base fabric side of the plush ribbon 10 so as to prevent cast-off of the piles. The surface temperature of the drum 20 is about 200° C. The tension of the plush ribbons 10 before the heating drum 20 is controlled by a plurality of tension bars 13, 14, 15, 16, 17, 18 and 19, e.g., stainless steel bars of about 10 mm$\phi$, and tension rollers 21 and 22, through which the plush ribbons 10 are fed from the untwisting device 12 to the heating drum 10. The tension of the plush ribbons 10 before the heating drum 20 may be controlled by using nip rollers having such elastic surfaces that will not affect the piles of the plush ribbons 10. Behind the heating drum 20, the tension of the plush ribbons 10 is controlled by a dancer roller 26 with a weight 27 hanging thereon. In this instance, the total tension of the plush ribbons 10 before and behind the heating drum 20 is maintained to be 460 g.

Contact sensors 28 and 29 are disposed above and below the dancer roller 26. When the dancer roller 26 is moved to contact with the upper sensor 28, the rotating speed of the heating drum 20 is increased to lower the tension of the plush ribbon 10 behind the heating roller 20. When the dancer roller 26 is moved to contact with the lower sensor 29, the rotating speed of the heating drum 20 is decreased to raise the tension. Thus, the tension behind the heating drum 20 is controlled or compensated by changing the rotating speed of the drum 20 with reference to the position of the dancer roller 26. The sensors 28 and 29 may be photosensors. The position of the dancer roller 26 may be determined by detecting the angle of the dancer roller 26 relative to a pivotal axis 26a thereof.

After passing through the thermal press treatment on the heating drum 20, the plush ribbons 10 are fed to a shearing section. In the shearing section, the piles are cut into the same length by two pairs of screw cutter and bottom cutting edge 31 and 33; 32 and 34. The length of the piles 10 is controlled to be constant by using a laser thickness detector consisting of a light projector 35a and a light receptor 35b.

The plush ribbons 10 having the uniformly cut piles are fed to a not-shown soaping process for washing oil from the ribbons 10 which has been soaked for weaving. Thereafter, each strip of the plush ribbons 10 is stored in a box 39. The plush ribbons 10 stored in the boxes 39 are fed to an antistatic solution trough 43 through nip rollers 42a and 42b and a dip roller 44, after being untwisted by an untwisting device 41 similar to the above-described device 12. The antistatic solution contains, for example, an antistatic agent "DEATRON N" made by Kabushiki Kaisha Nikka Chemical Co., at the rate of 5 g/litter. Thereafter, the plush ribbons 10 are squeezed by nip rollers 45a and 45b at a squeezing rate of 200%, for instance.

Squeezing rate S is defined by the following equation:

$$S = W1 \div W2 \times 100$$

wherein,

W1 is the weight of a ribbon per unit area after being squeezed; and

W2 is the absolute dry weight per unit area of the ribbon.

It is possible to soak the plush ribbon 10 in water in the boxes 39, and squeeze them by the nip rollers 42a and 42b at a squeezing rate of 100%, before dipping them in the antistatic solution in the trough 43. Then, the ribbons 10 are uniformly squeezed at the squeezing rate of 200%.

It is also possible to fill the boxes 36 with antistatic solution, such as containing 5 g/litter of "DEATRON N", to soak the plush ribbons 10 in it. According to this modification, the antistatic agent may firmly soak into the plush ribbons 10 to improve the antistatic effect. Moreover, the plush ribbons 10 may be squeezed by the nip rollers 45a and 45b at the squeezing rate of 200% without being passed through the trough 43 by the nip rollers 42a and 42b and the dip roller 44. For the antistatic treatment, materials and/or methods as disclosed in JPA Nos. 55-12917, 62-286041 and 62-286042 and JPU No. 46-28218 may be applicable.

The nip rollers 42a and 42b; 45a and 45b squeeze the four plush ribbons 10 each independently. The nip rollers 42a, 42b, 45a and 45b are each divided into four independent rollers having a width necessary for uniform squeezing. The nip rollers 42a, 42b, 45a and 45b are individually driven by a motor 47, while a tension pickup device 48 feeds back the tension of the respective plush ribbons 10 to respective drive systems for the independent rollers of the nip rollers 42a, 42b, 45a and 45b, as implied by dashed line. Thereby, the speeds of the nip rollers 42a, 42b, 45a and 45b are controlled to keep the tension of each of the four plush ribbons 10 constant.

It is possible to form each of the nip rollers 42a, 42b, 45a and 45b as a single roller, in order to simplify the control system. In this modification, the tension pickup device merely performs tension detection.

Figure 6:
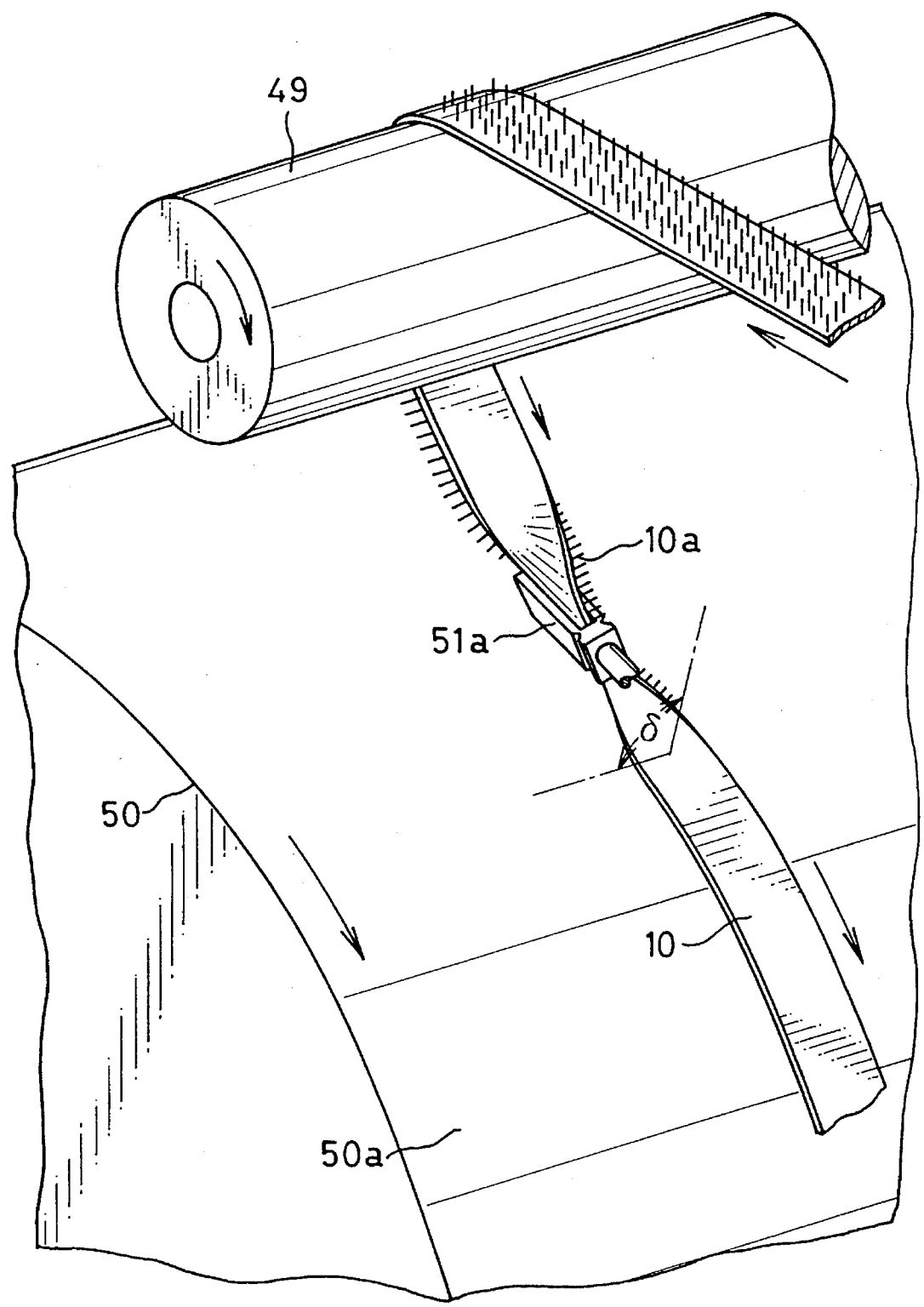
FIG. 6 is an explanatory diagram illustrating a relationship between a plush ribbon, a twister and a heating drum as illustrated in FIG. 5.

The plush ribbons 10 containing the antistatic solution at the substantially constant rate are fed to a heating drum 50 through a guide roller 49. The piles 10a of the plush ribbons 10 are inclined diagonally by being pressed onto the heating drum 50, while being twisted by twisters 51a to 51d disposed between the guide roller 49 and the heating drum 50. As shown in FIG. 6, each plush ribbon 10 is twisted by being threaded through one of the four twisters 51a to 51d. The twisting angle δ is, e.g., about 135° relative to the surface of the preceding portion of the plush ribbon 10.

Then, the piles 10a of the twisted plush ribbon 10 are brought into contact with a peripheral surface 50a of the heating drum 50 gradually from one lateral side to the entire surface of the plush ribbon 10. Thereby, the piles 10a are bent in the width direction of the plush ribbon 10.

Figure 7:
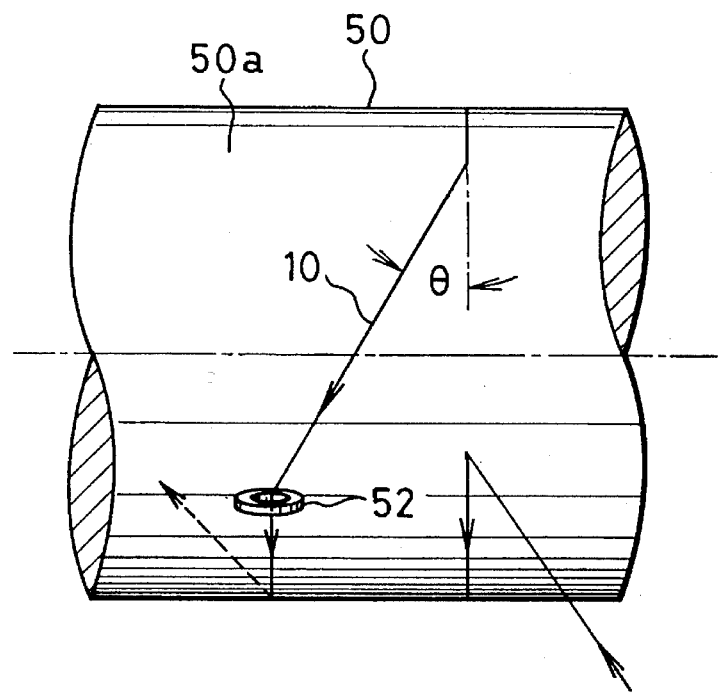
FIG. 7 is an explanatory diagram illustrating a diagonal or helical traversing path of the plush ribbon wound around the heating drum.

The peripheral speed of the heating drum 50 is set to be different from the feeding speed of the plush ribbon 10. For example, the peripheral speed of the heating drum 50 is 7.4 m/min, while the feeding speed is 6 m/min. By virtue of the difference in speed, the piles 10a are inclined in the ribbon feeding direction of the plush ribbon 10 as well. Thereafter, the plush ribbons 10 are wound around the periphery 50a of the heating drum 50 almost by one convolution, so as to make the piles 10a slide on the periphery 50a. Thus, the plush ribbons 10 are dried at the surface temperature of the heating drum 50, that is, at around 130° C. As shown in FIG. 7, each plush ribbon 10 is shifted in a direction traversing the initial feeding direction of the ribbon 10 or a rotating direction of the heating drum 50, on the way of its convolution. In this embodiment, the plush ribbon 10 is shifted by a traverse guide ring 52, diagonally at an angle θ, e.g., about 30° from a point where the plush ribbon 10 is almost dried. This diagonal shifting or helical winding of the ribbons 10 further applies force to the piles 10a to incline them in the diagonal direction. Therefore, the diagonal inclination of the piles 10a is made steady.

To efficiently wind a plurality of plush ribbons 10 around the peripheral surface 50a of the heating drum 50 having a limited width, the twister 51b for the second plush ribbon 10 is disposed between the twister 51a for the first plush ribbon 10 and the traverse guide ring 52a for the first plush ribbon 10, and the twister 51c for the third plush ribbon 10 is disposed between the twister 51b and the traverse guide ring 52b for the second plush ribbon 10, and so on. Because the traverse guide rings 52a to 52d are also used to return the plush ribbons 10 to the initial feeding direction that is parallel to the rotating direction of the heating drum 50, it is desirable to dispose the traverse guide rings 52a to 52d in the proximity of the exit of the heating drum 50.

After the piles 10a are thus inclined by the thermal press on the heating drum 50, the plush ribbons 10 are fed to a heating drum 55 for heat-setting, thereby to completely dry the plush ribbons 10 and fix the inclination of the piles 10a. The surface temperature of the heating drum 55 is set higher than that of the heating drum 50, e.g., around 170° C. The heating drums 50 and 55 are driven synchronously with each other by a motor 56. It is possible to control the respective speeds of the heating drums 50 and 55 through speed change gears.

Thereafter, the plush ribbons 10 are continuously measured by a laser thickness detector 57, and fed to a shaking device 63 through nip rollers 59a and 59b. The shaking device 63 shakes the plush ribbons 10 down on a reservoir tray 64. The nip roller 59b is divided into four independent rollers which are individually driven by a motor 61. A tension pickup device 62 feeds back respective tensions of the four plush ribbons 10 to control respective speeds of the divided rollers of the nip rollers 59a and 59b, so as to maintain the tension of the plush ribbons 10 constant between the nip rollers 45a and 45b and the nip rollers 59a and 59b.

The plush ribbons 10 having the piles 10a fixedly inclined in the diagonal direction are transported to cutting and attaching process by each reservoir tray 64, so as to be cut into a predetermined length and attached to the upper and lower inside surfaces of the film passage mouth of a photographic film cassette such as shown in FIG. 2, wherein the width direction of the plush ribbon 10 is aligned to the film advancing direction in the manner as shown in FIG. 3.

Although the angle θ of the diagonal traversing of the plush ribbon 10 on the heating drum 50 is set at 30° in the above described embodiment, the angle θ may be in a range of 10° to 60°, preferably in a range of 25° to 35°. For example, the plush ribbon 10 is a narrow pile fabric woven of nylon 6 for base fabric and nylon 66 for piles by a needle loom, and is dyed in black with "Mitsui Nylon Black SGL 9% OWF" by a wince dyeing machine. However, another kind fiber may be used for weaving the plush ribbon 10 so far as the fiber is made of thermoplastic material, e.g. polyester.

Figure 8:
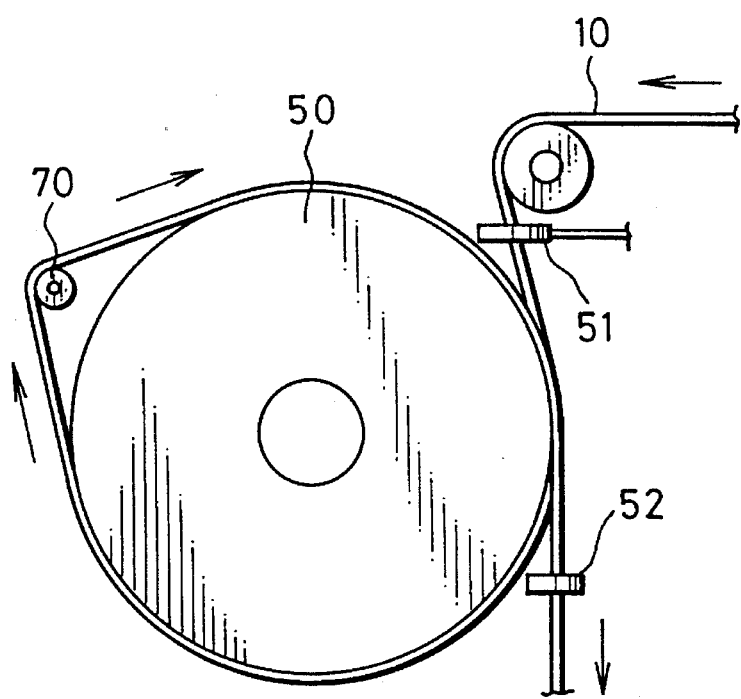
FIG. 8 is an explanatory diagram illustrating another embodiment where a stationary roller is provided in association with the heating drum, for defining a starting point of the traversing of the plush ribbon on the heating drum.

It is preferable to fix the starting point of the traversing of each plush ribbon 10 by a stationary roller 70 which is disposed in the proximity of the heating drum 50, such that the plush ribbon 10 is guided by the stationary roller 70 to be transiently off the peripheral surface 50a of the heating drum 50, as is shown in FIG. 8.

Figure 9:
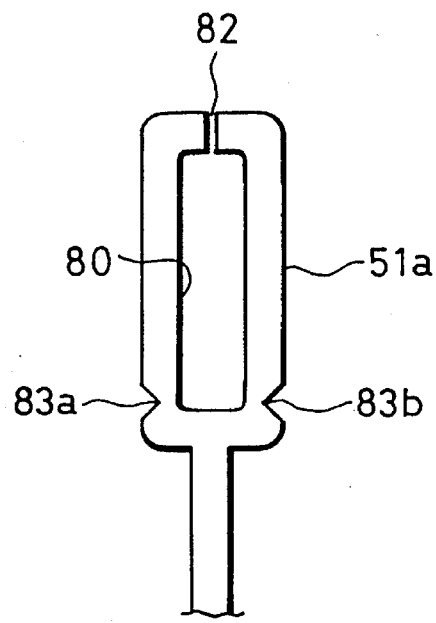
FIG. 9 illustrates a preferred shape for the twister used in the present invention.

FIG. 9 shows a preferable shape of the twisters 51a to 51d with respect to the first twister 51a. As shown, the twister 51a to 51d preferably has a slender shape with a narrow passage 80 through which the ribbon 10 is threaded. By virtue of a slit 82 formed at the tip and narrowed base portions 83a and 83b, the twisters 51a to 51d are made flexible so that a thicker portion such as a joint in the plush ribbon 10 may pass through the narrow passage 80 of the twister 51a to 51d.

It is possible to dispose an image analyzing device such as using a CCD camera in the proximity of a guide roller 85, so as to measure the inclination of the piles 10a.

Moreover, it is possible to use a single heating drum instead of the heating drums 50 and 55, and wind each plush ribbon by two convolutions around the single heating drum for imparting and heat-setting the inclination. In this case, two heaters having different capacities should be separately disposed inside the single heating drum. It is also possible to use three heating drums for drying, inclining and heat-setting.

Figure 5:
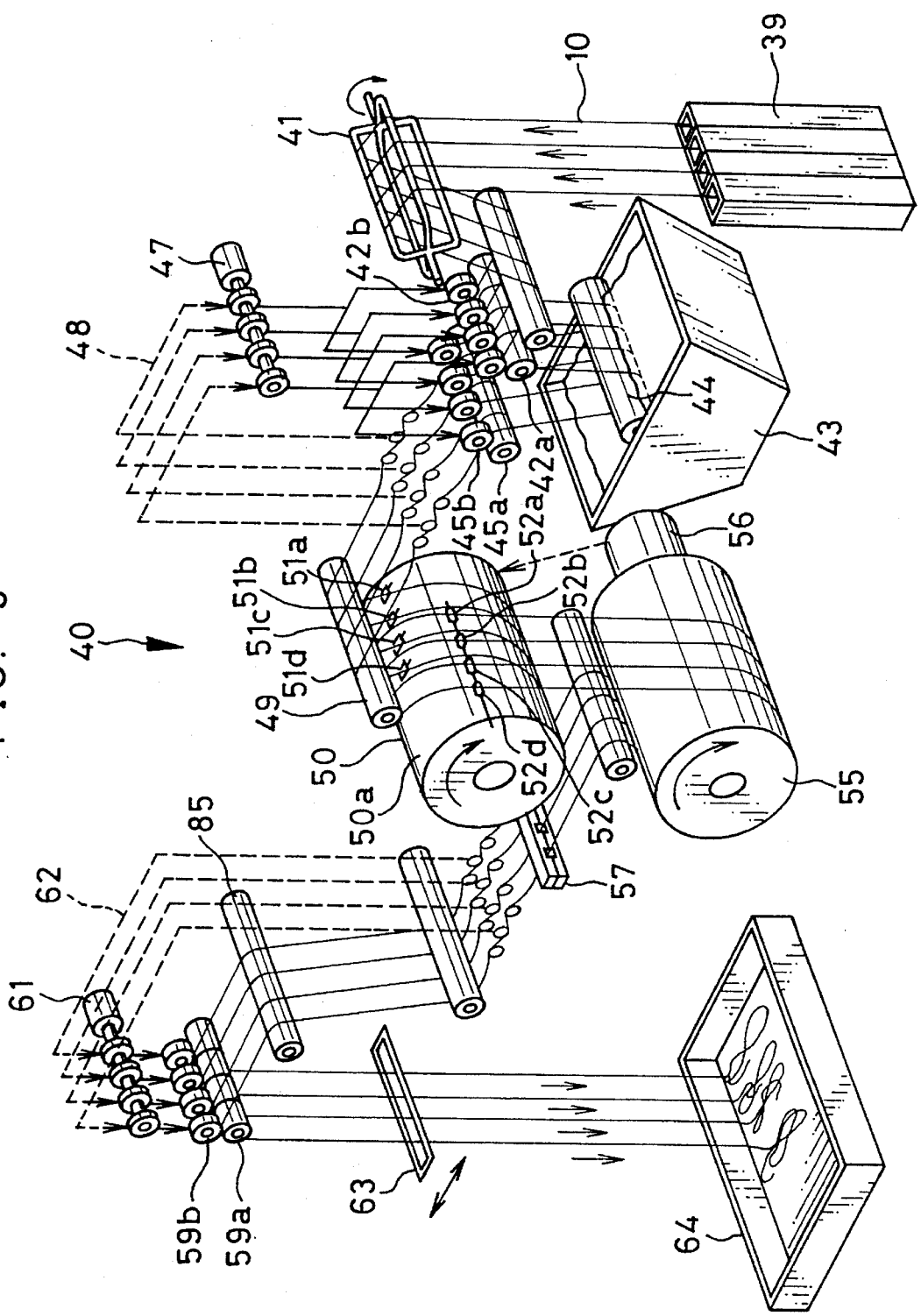
FIG. 5 is a schematic diagram illustrating a pile inclining apparatus according to an embodiment of the present invention.
Figure 10:
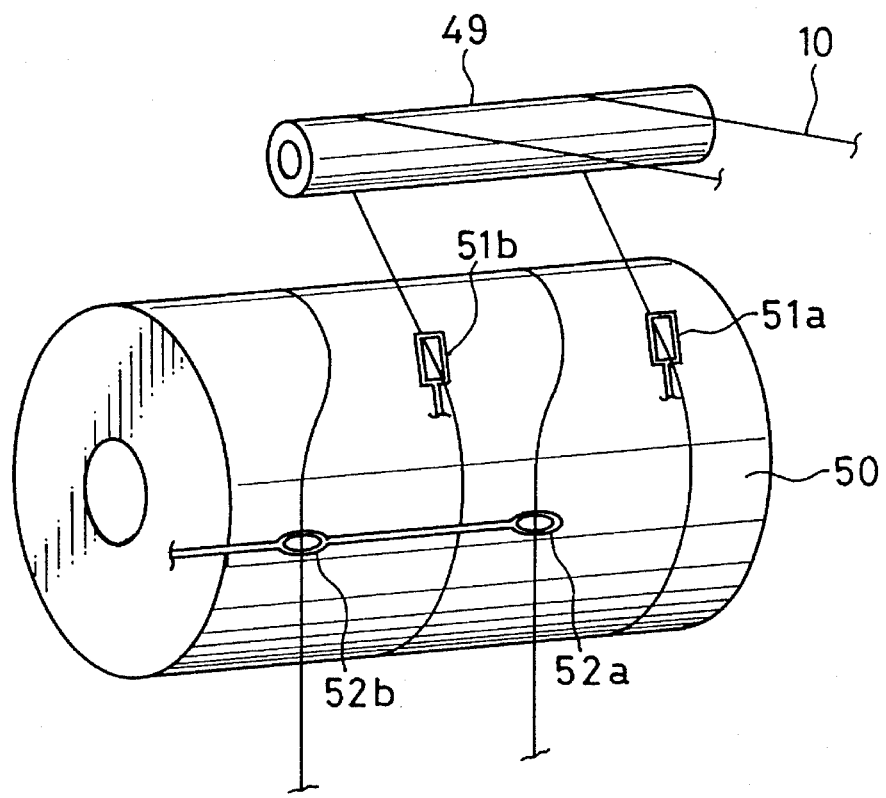
FIG. 10 illustrates an alternate method for winding plush ribbons around a heating drum.

While the plush ribbons 10 are wound around the heating drum 50 in the manner as described with reference to FIG. 5 in the above embodiment, it is possible to wind the plush ribbons 10 in a manner as shown in FIG. 10. According to the winding manner shown in FIG. 10, a wider space for the traversing may be provided, so that the inclination will be made more steady, although the number of the plush ribbons 10 allowed to be concurrently wound around the heating drum 50 is reduced.

Although the present invention has been described in detail with respect to the preferred embodiments shown in the drawings, the present invention should not be limited to the embodiments, but on the contrary, various modifications may be possible without departing from the scope of the appended claims.

What is claimed is:

1. A method of finishing a pile fabric woven into a ribbon having uniformly inclined piles, having the steps of moistening said ribbon at a predetermined rate, twisting said ribbon relative to a feeding direction of said ribbon and, thereafter, contacting said piles of said ribbon onto a first heating drum which extends transverse to said feeding direction, said method comprising the steps of:

drying said ribbon while sliding said ribbon on a peripheral surface of said first heating drum; and shifting said ribbon in a direction to diagonally traverse said peripheral surface during said drying step.

2. A method as recited in claim 1, wherein said pile fabric is used as light-trapping members to be disposed in a film passage mouth of a photographic film cassette.

3. A method as recited in claim 2, wherein said photographic film cassette has a cassette shell rotatably containing a spool with a photographic film wound thereon, and a leading end of said photographic film is advanced out of said cassette shell through said film passage mouth by rotating said spool in an unwinding direction.

4. A method as recited in claim 1, further comprising the step of pressing said ribbon onto a second heating drum disposed behind said first heating drum in said feeding direction of said ribbon for heat-setting the inclination of said piles, said second heating drum having a higher surface temperature than said first heating drum.

5. A method as recited in claim 4, wherein said pile fabric is used as light-trapping members to be disposed in a film passage mouth of a photographic film cassette.

6. A method as recited in claim 5, wherein said photographic film cassette has a cassette shell rotatably containing a spool with a photographic film wound thereon, and a leading end of said photographic film is advanced out of said cassette shell through said film passage mouth by rotating said spool in an unwinding direction.

7. A method as recited in claim 1, wherein said first heating drum is rotated so that a peripheral speed of said first heating drum differs from a speed of feeding said ribbon.

8. A method as recited in claim 7, wherein a plurality of said ribbons are fed to and wound around said first heating drum in parallel with one another.

9. A method as recited in claim 8, wherein said shifting step of said ribbon is started after winding said ribbon on said first heating drum by a predetermined length in a rotating direction of said first heating drum.

10. A method as recited in claim 9, wherein said diagonal traversing direction in said shifting step is in a range of 10° to 60°, preferably 25° to 35°, relative to said rotating direction of said first heating drum.

11. A method as recited in claim 10, wherein said moistening step comprising the steps of soaking said ribbon in an antistatic solution and thereafter squeezing said ribbon at a squeezing rate of 200%, said squeezing rate being defined as follows:

$$S = W1 \div W2 \times 100$$

wherein,

S is squeezing rate

W1 is the weight of said ribbon per unit area after being squeezed; and

W2 is the absolute dry weight per unit area of said ribbon.

12. A method as recited in claim 11, wherein said ribbon is twisted at an angle of 135°.

13. A method of finishing a pile fabric woven into a ribbon consisting of a base fabric and uniformly inclined piles, having the steps of shearing said piles into a constant length before imparting inclination to said piles, said method comprising the steps of:

contacting said base fabric of said ribbon onto a heating drum which is disposed before a shearing device in a ribbon feeding direction, so as to prevent cast-off of said piles;

adjusting the tension of said ribbon to be constant with a plurality of tension rollers and tension bars before said heating drum;

adjusting the tension of said ribbon behind said heating drum by changing rotating speed of said heating drum along with the movement of a dancer roller through which said ribbon is fed from said heating drum to said shearing device.

14. A method as recited in claim 13, wherein said pile fabric is used as light-trapping members to be disposed in a film passage mouth of a photographic film cassette.

15. A method as recited in claim 14, wherein said photographic film cassette has a cassette shell rotatably containing a spool with a photographic film wound thereon, and a leading end of said photographic film is advanced out of said cassette shell through said film passage mouth by rotating said spool in an unwinding direction.

16. An apparatus for finishing a pile fabric woven into a ribbon having uniformly inclined piles, having a device for moistening said ribbon at a predetermined rate, a device for twisting said ribbon relative to a feeding direction of said ribbon and a first heating drum which extends transverse to said feeding direction so that said piles are pressed against a peripheral surface of said first heating drum while said ribbon being twisted by said twisting device, said apparatus comprising:

a device for feeding and winding said ribbon around said first heating drum;

a device for rotating said first heating drum at a peripheral speed different from a feeding speed of said ribbon, so as to cause said ribbon to slide on a peripheral surface of said first heating drum; and a device for guiding said ribbon to shift in a direction to diagonally traverse said peripheral surface by a predetermined length.

17. An apparatus as recited in claim 16, further comprising a second heating drum disposed downstream from said first heating drum, for heat-setting the inclination of said piles.

18. An apparatus as recited in claim 17, wherein said twisting device has a narrow passage, through which said ribbon is threaded, and has a slit formed at a tip thereof and narrowed base portions so as to be flexible in a direction to widen said passage.

19. An apparatus as recited in claim 18, further comprising a stationary roller disposed near said first heating drum between said twisting device and said guiding device in said feeding direction of said ribbon, so as to define a starting point of said diagonal traversing.

* * * * *